US009561902B1

(12) United States Patent
Veix

(10) Patent No.: US 9,561,902 B1
(45) Date of Patent: Feb. 7, 2017

(54) GATE ASSEMBLY FOR A BULK FEEDER

(71) Applicant: KHS GmbH, Dortmund (DE)

(72) Inventor: Scott Veix, Bradenton, FL (US)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/857,128

(22) Filed: Sep. 17, 2015

(51) Int. Cl.
*F16K 1/20* (2006.01)
*B65D 90/64* (2006.01)

(52) U.S. Cl.
CPC ............. *B65D 90/64* (2013.01); *F16K 1/2014* (2013.01); *F16K 1/2021* (2013.01); *B65D 2588/54* (2013.01); *B65D 2590/662* (2013.01)

(58) Field of Classification Search
CPC .............. B65D 90/64; B65D 2588/54; B65D 2590/662; F16K 1/2014; F16K 1/2021
USPC ...... 251/212, 147, 300; 222/502–503, 181.1, 222/185.1
See application file for complete search history.

(56) References Cited

U.S. PATENT DOCUMENTS

| | | | | |
|---|---|---|---|---|
| 543,182 A * | 7/1895 | Hunt | ..................... | B65D 90/582 105/283 |
| 1,443,181 A * | 1/1923 | Hill, Sr. | ................ | B65D 90/623 222/185.1 |
| 2,035,329 A * | 3/1936 | McPhail | ............. | B65D 47/089 137/38 |
| 2,094,707 A * | 10/1937 | Jones | ..................... | E21B 34/16 138/45 |
| 2,309,895 A * | 2/1943 | Griffith | .............. | B65D 47/2037 222/490 |
| 2,721,678 A * | 10/1955 | Gill | ........................ | F16K 15/035 222/445 |
| 2,934,966 A * | 5/1960 | Wood | .................... | F02K 1/1207 138/45 |
| 2,956,582 A * | 10/1960 | Pranter | ..................... | F16K 1/16 137/512.1 |
| 3,127,148 A * | 3/1964 | Collar | .................. | F16L 29/007 137/527 |
| 3,417,961 A * | 12/1968 | Shorrock | ................ | F16K 1/223 251/212 |
| 3,491,923 A * | 1/1970 | Osipov | ................ | F27D 3/0028 222/503 |
| 3,716,207 A * | 2/1973 | Schweikl | .................. | F02K 1/62 239/265.29 |
| 3,842,992 A * | 10/1974 | Herold | ................... | B65G 47/72 193/31 R |

(Continued)

FOREIGN PATENT DOCUMENTS

DE 3832383 5/1989
DE 4013290 7/1991

(Continued)

*Primary Examiner* — John Bastianelli
(74) *Attorney, Agent, or Firm* — Allen Dyer Doppelt Milbrath & Gilchrist

(57) ABSTRACT

A gate assembly for a bulk feeder includes a gate housing and a plurality of paddles. The gate housing defines a product feed path therein extending between intake and dispensing ends. The plurality of paddles are mounted to the gate housing and pivotable between a closed position and an open position. In the closed position, the product feed path is blocked by the plurality of paddles, and unblocked in the open position. In the closed position, the plurality of paddles collectively forms a polyhedron, open facing the intake end and tapering to a closed apex toward the dispensing end.

18 Claims, 3 Drawing Sheets

(56) References Cited

U.S. PATENT DOCUMENTS

| | | | | |
|---|---|---|---|---|
| 4,067,540 | A * | 1/1978 | Slade | E21B 21/10 |
| | | | | 251/212 |
| 4,163,726 | A * | 8/1979 | Wilson | F16K 3/03 |
| | | | | 210/512.1 |
| 4,178,638 | A * | 12/1979 | Meyer | A61F 2/2403 |
| | | | | 137/512 |
| 4,190,085 | A * | 2/1980 | Hasa | F24F 13/105 |
| | | | | 138/45 |
| 4,351,358 | A * | 9/1982 | Ogle, Jr. | F16K 15/035 |
| | | | | 137/512.1 |
| 4,586,694 | A * | 5/1986 | Jones | F16L 37/38 |
| | | | | 251/149.2 |
| 5,241,989 | A * | 9/1993 | Kalavitis | F16K 1/2021 |
| | | | | 137/242 |
| 5,323,804 | A * | 6/1994 | Lin | E03F 5/0407 |
| | | | | 137/362 |
| 6,299,034 | B1 * | 10/2001 | Tancheff | B05C 17/00516 |
| | | | | 222/502 |
| 6,626,418 | B2 * | 9/2003 | Kiehne | F16K 15/147 |
| | | | | 251/149.6 |
| 6,969,044 | B2 * | 11/2005 | Delzer | F16K 3/22 |
| | | | | 251/147 |
| 7,802,432 | B2 * | 9/2010 | Erno | B05B 1/30 |
| | | | | 239/455 |

FOREIGN PATENT DOCUMENTS

| | | |
|---|---|---|
| DE | 102004036273 | 3/2006 |
| DE | 102005018076 | 11/2006 |
| DE | 102007013093 | 9/2008 |
| DE | 102008050729 | 4/2010 |
| DE | 202010004066 | 6/2010 |
| DE | 202012104822 | 4/2014 |
| DE | 102012222335 | 6/2014 |
| EP | 1772377 | 4/2007 |
| JP | 2002296099 | 10/2002 |
| JP | 2008247479 | 10/2008 |
| JP | 5080362 | 12/2009 |
| JP | 4951666 | 4/2010 |
| JP | 4951667 | 4/2010 |
| JP | 2010137953 | 6/2010 |
| JP | 2013086890 | 5/2013 |

* cited by examiner

GATE ASSEMBLY FOR A BULK FEEDER

FIELD OF THE INVENTION

The present invention relates to bulk feeders for controlled dispensing of particulate products, and more particularly, to bulk feeders having a gate controlling the release of product from the feeder during packaging operations.

BACKGROUND OF THE INVENTION

Bulk feeders are widely used to dispense controlled amounts of particulate products. In a typical food packaging application, a predetermined amount of product is dispensed into a bulk feeder above a closed gate. An open container, such as a pouch, is positioned under the bulk feeder, the gate is opened and the product falls into the container. The gate is re-closed so that the feeder can be reloaded with product, the filled container is moved for further processing, and the process repeats itself. While existing bulk feeders are quite useful, further improvements are possible.

SUMMARY OF THE INVENTION

In view of the foregoing, it is an object of the present invention to provide an improved gate assembly for a bulk feeder. According to an embodiment of the present invention, a gate assembly for a bulk feeder includes a gate housing and a plurality of paddles. The gate housing defines a product feed path therein, extending between intake and dispensing ends. The plurality of paddles are mounted to the gate housing and pivotable between a closed position and an open position. In the closed position, the plurality of paddles form a polyhedron, open facing the intake end and tapering to a closed apex toward the dispensing end, so as to block the product feed path, which is unblocked in the open position. According to an aspect of the present invention, each of the plurality of paddles has a triangular shape such that the plurality of paddles collectively forms an inverted pyramid in the closed position.

These and other objects, aspects and advantages of the present invention will be better appreciated in view of the drawings and following detailed description of preferred embodiments.

DETAILED DESCRIPTION OF PREFERRED EMBODIMENTS

Figure 1:
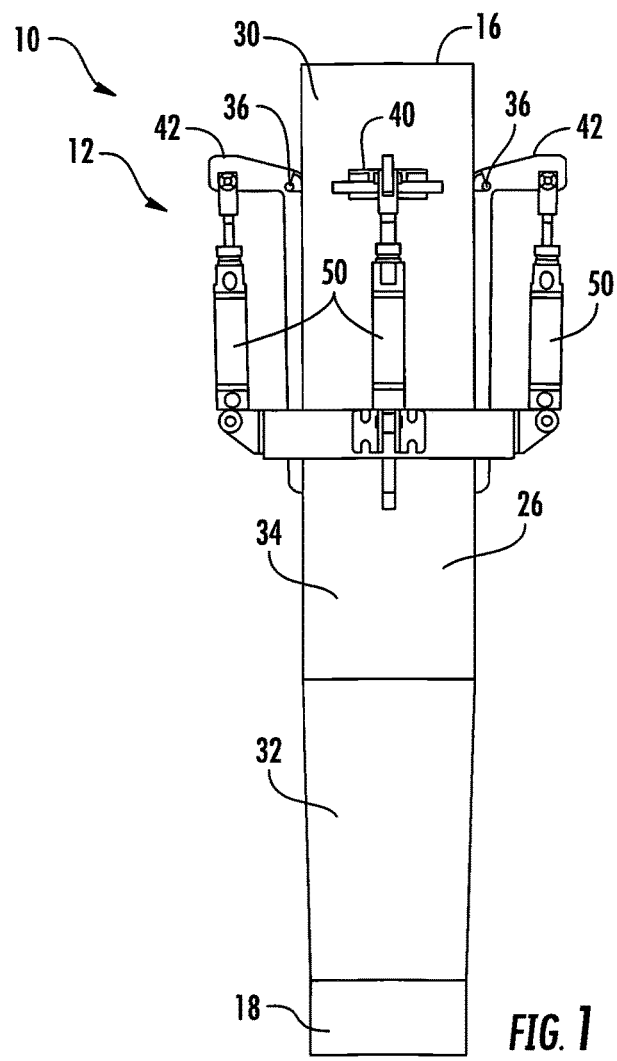
FIG. 1 is a side view of a gate assembly for a bulk feeder, according to an embodiment of the present invention.
Figure 2:
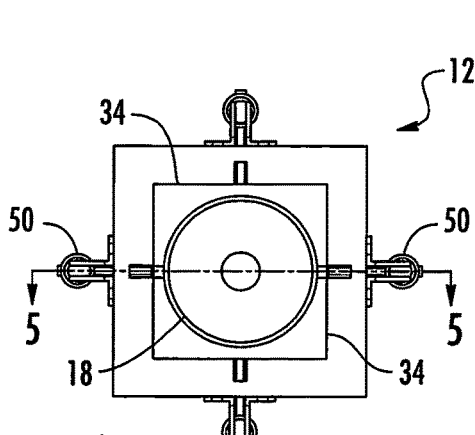
FIG. 2 is a bottom view of the gate assembly of FIG. 1, with a plurality of paddles in an open position.
Figure 3:
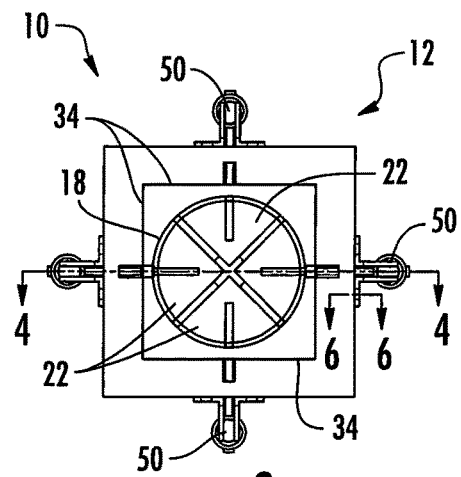
FIG. 3 is a bottom view of the gate assembly of FIG. 1, with the plurality of paddles in a closed position.
Figure 5:
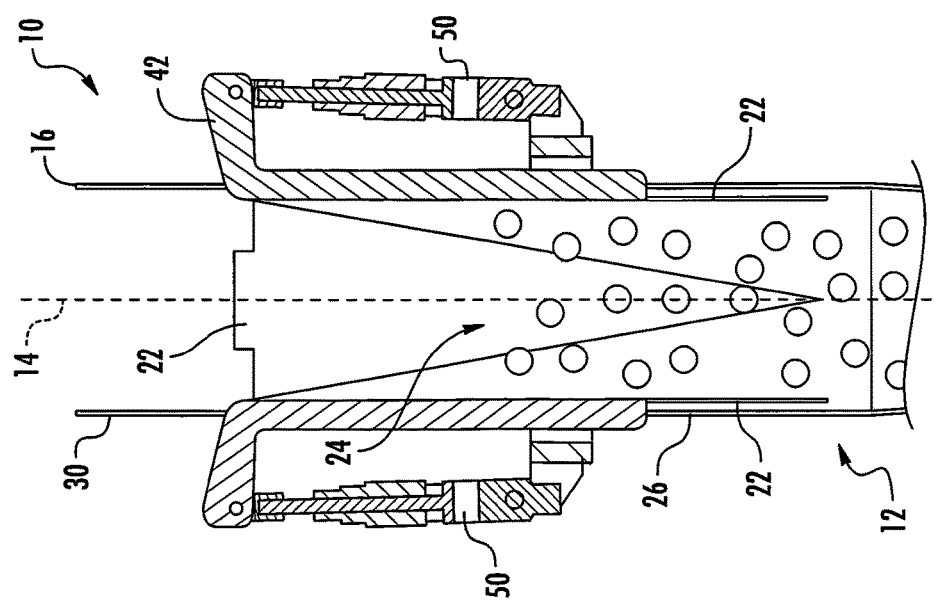
FIG. 5 is a sectional view taken along line 5-5 of FIG. 2.

Referring to FIGS. 1-5, according to an embodiment of the present invention, a gate assembly 10 for a bulk feeder includes a gate housing 12 defining a product feed path 14 extending therethrough between intake and dispensing ends 16, 18. A plurality of paddles 22 are mounted to the gate housing 12 and pivotable between a closed position (FIGS. 3 and 4) and an open position (FIGS. 2 and 5). In the open position, the paddles 22 allow particulate product 24 to flow along the feed path 14 to exit the dispensing end 18. In the closed position, the paddles 22 form a polyhedron, open facing the intake end 16 and tapering to a closed apex toward the dispensing end 18, so as to block the flow of product 24 along the feed path 14.

The gate housing 12 preferably includes a central section 26 mounting the paddles 22, as well as upper and lower sections 30, 32. The upper section 30 is adapted for connection to a product intake source, and the lower section 32 is adapted to connect with a container fill spout or other structure, or to directly fill a container. As will be explained in greater detail below, the different sections of the date housing 12 can be made detachable to facilitate inspection, cleaning, maintenance and reconfiguration.

The central section 26 of the gate housing 12 advantageously has four sidewalls 34 forming a square cross-section, each sidewall 34 mounting a respective one of the paddles 22. Preferably, each paddle 22 pivotably mounts to its sidewall 34 outside of the gate housing 12 about a respective pivot axis 36. Paddles slots 40 are defined in each sidewall 34, each allowing a portion of its respective paddle 22 to extend therethrough (see also FIG. 6).

Each of the four paddles 22 advantageously defines at least two equal sides of an acute isosceles triangle such that, in the closed position, the resulting polyhedron collectively formed by the paddles 22 is an inverted pyramid tapering relatively gradually to its apex. This geometry results in reduced product 24 adhesion to the paddles 22 when loaded thereabove prior to opening. When the paddles 22 pull away outwardly during opening, the likelihood of product 24 sticking to the paddles 22 and forming a persistent blockage in the product feed path 14 is significantly reduced.

Figure 6:
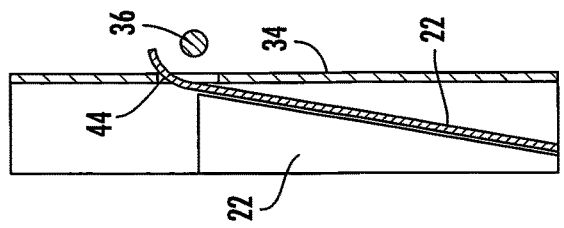
FIG. 6 is a sectional view taken along line 6-6 of FIG. 3.

Upper portions 42 of each paddle 22 extend outside of the gate housing 12. Referring particularly to FIG. 6, where each paddle 22 passes through the respective paddle slot 40, a transition portion 44 is formed with a curved surface that fits closely against the slot 40. The close fit of each transition portion 44 inhibits leakage of product 24, or accompanying dust or smaller particulates, through the slots 40.

Referring again to FIGS. 1-5, movement of the paddles 22 between the open and closed positions is effected by one or more actuators 50. Advantageously, a separate actuator 50 is connected to each paddle 22. The actuators 50 mount to the exterior of the central section 26 of the gate housing 12 and connect to the upper portions 42 of the paddles 22 outside thereof. Alternately, a lesser number of actuators could be used, with each mechanically linked to more than one paddle. Actuators of various configurations and having various motive forces (e.g., electromagnetic, pneumatic, hydraulic, etc.) could be used. In the depicted embodiment, pneumatic linear actuators 50 are employed. When the actuators 50 are retracted, the paddles 22 are pivoted into the closed position. When the actuators 50 are extended, the paddles 22 are pivoted into the open position.

The gate housing 12, paddles 22, actuators 50 and associated mechanical components, linkages and the like can be made of any suitable material, including various metals and plastics. Material choices can advantageously be made taking into account the required durability for a given application, compatibility with the product 24 (e.g., including use of food-safe and readily sanitizable materials), noise considerations (e.g., the use of plastic buffer materials on actuators and/or paddles to eliminate metallic "clanging"), and the like. Selected materials can be coated, where desired. For example, food-safe and/or non-stick coatings could be applied to the paddles 22.

The present invention is also not limited to the precise configuration depicted. For example, while a four paddle embodiment is depicted, it will appreciated that a three paddle embodiment or embodiments with more than four paddles could be used within the scope of the present invention. Additionally, the referenced polyhedron shape should be understood as formed by the inner surfaces of the paddles (i.e., the surfaces which would normally come into conduct with product). Moreover, as used herein, a "polyhedron" should not be construed as requiring strictly flat paddles, such that three or more adjoining paddles incorporating curvature either in or around the direction of the product feed path would still be considered to form a polyhedron. Likewise discrete protuberances, such as guide or alignment tabs, would not detract from the polyhedral nature of the shape formed by the closed paddles.

Figure 4:
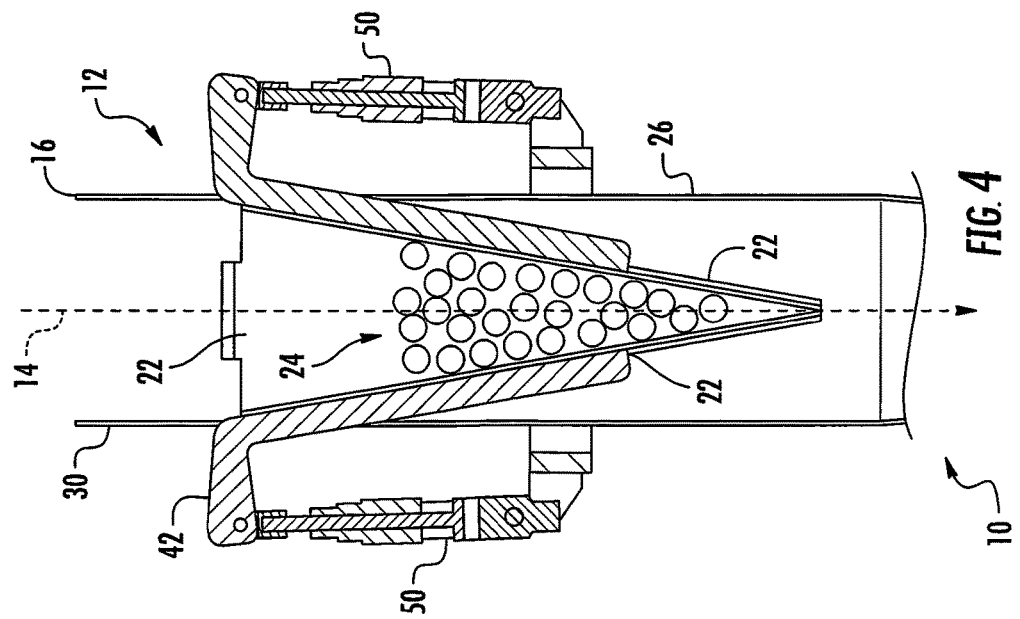
FIG. 4 is a sectional view taken along line 4-4 of FIG. 3.

During operation, the gate assembly 10 is loaded with a predetermined amount of product 24 with the paddles 22 in the closed position (as in FIG. 4). An open container is positioned under the dispensing end 18, or an additional chute or nozzle communicating therewith. The actuators 50 are operated to simultaneously retract the paddles 22 into the open position (as in FIG. 5), allowing the loaded product 24 to fall into the open container via the dispensing end 18. With the gate assembly 10 empty, the actuators 50 are operated to return the paddles 22 to the closed position. With the gate assembly 10 reloaded with product 24 and a new container under the dispensing end 18, the process can be repeatedly indefinitely.

Figure 7:
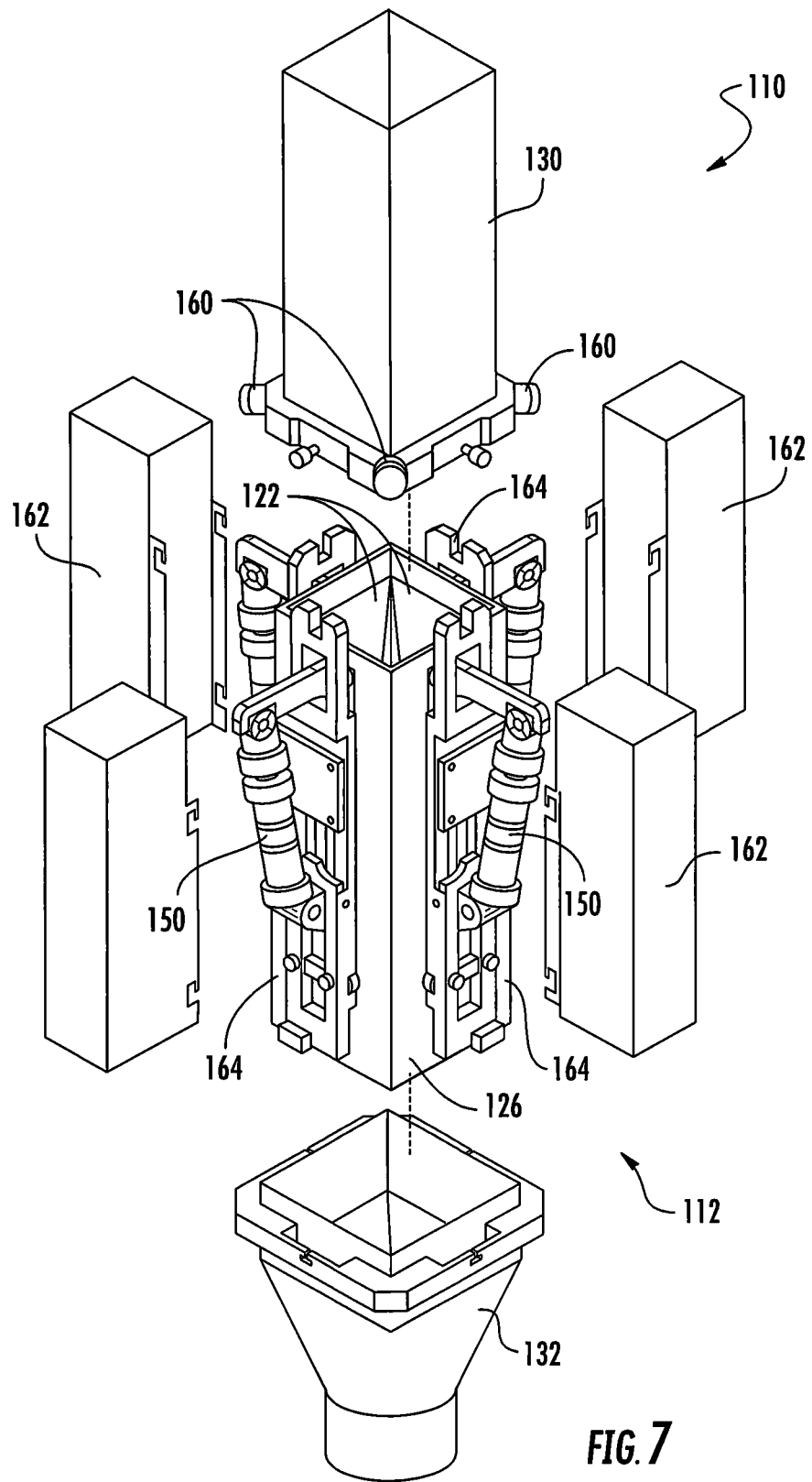
FIG. 7 is a partially exploded perspective view of a gate assembly for a bulk feeder, according to another embodiment of the present invention.

Aspects of the present invention could also be advantageously employed in connection with other features. For example, referring to FIG. 7, a gate assembly 110 with like features being give like reference numbers (preceded by a "1") to the gate assembly 10. Except as specifically described, the gate assembly 110 functions essentially the same as the gate assembly 10.

The gate assembly 110 has a gate housing 112 with the upper and lower sections 130, 132 readily detachable from the central section 126. This configuration facilitates inspection and cleaning, as well as maintenance and replacement of the paddles 122 and actuators 150. Additionally, a common central section 126 could be mated with different upper and lower sections for easier adaption to different production lines.

Air fittings 160 are incorporated into the gate housing 112 to allow the introduction of one or more gases thereinto. For example, nitrogen could be introduced to help purge oxygen, while any type of air introduction could be used to help facilitate the free flow of particulate product.

Separate covers 162 for each of the actuators 150 are attached to the central section 126 of the gate housing 112. The covers 162 help keep the actuators 150 and other moving parts debris-free during operation. To better support the actuators 150 and prevent any deformation of the gate housing 112, the actuators 150 and paddles 122 are mounted on increased gage brackets 164.

The above-described embodiments are provided for illustrative purposes; the present invention is not necessarily limited thereto. Rather, those skilled in the art will appreciate that various modifications, as well as adaptations to particular circumstances, will fall within the scope of the invention herein shown and described, and of the claims appended hereto.

What is claimed is:

1. A gate assembly for a bulk feeder, the gate assembly comprising:
a gate housing defining a product feed path therein extending between intake and dispensing ends;
a plurality of paddles mounted to the gate housing and pivotable between a closed position, in which the product feed path is blocked by the plurality of paddles, and an open position, in which the product feed path is unblocked by the plurality of paddles; and
at least one actuator connected to the plurality of paddles for effecting movement between the closed and open positions;
wherein, in the closed position, the plurality of paddles collectively forms a polyhedron, open facing the intake end and tapering to a closed apex toward the dispensing end
wherein each of the plurality of paddles is pivotably mounted outside the gate housing and the gate housing defines a plurality of paddle slots through which a respective transition portion of each of the plurality of paddles passes from outside to inside the gate housing.

2. The gate assembly of claim 1, wherein the plurality of paddles collectively forms an inverted pyramid in the closed position.

3. The gate assembly of claim 2, wherein each of the plurality of paddles defines equal sides of an acute isosceles triangle.

4. The gate assembly of claim 1, wherein each of the respective transition portions defines a curved surface about a respective pivot axis of each of the plurality of paddles, the curved surfaces each fitting closely against a respective one of the plurality of paddle slots to inhibit leakage of product therethrough.

5. The gate assembly of claim 1, wherein the plurality of paddles includes four paddles.

6. The gate assembly of claim 5, wherein each of the four paddles defines at least two sides of substantially identical triangles.

7. The gate assembly of claim 6, wherein each of the four paddles defines at least two equal sides of substantially identical acute isosceles triangles.

8. The gate assembly of claim 5, wherein the gate housing includes four sidewalls extending from the intake and dispensing ends of the feed path, a respective one of the four paddles being mounted on each of the four sidewalls.

9. The gate assembly of claim 1, wherein the at least one actuator includes a separate actuator for each of the plurality of paddles.

10. The gate assembly of claim 9, wherein the each of the separate actuators is mounted outside of the gate housing.

11. The gate assembly of claim 10, wherein an upper portion of each of the plurality of paddles extends outside the gate housing through a respective slot defined therein and connects to a respective one of the separate actuators.

12. The gate assembly of claim 11, further comprising a cover for each of the separate actuators removably connected to the gate housing thereabout.

13. The gate assembly of claim 1, further comprising at least one at least one air fitting extending through the gate housing for the introduction of air thereinto.

14. The gate assembly of claim 13, wherein the at least one air fitting is arranged more proximate to the intake end of the product feed path than the plurality of paddles.

15. A gate assembly for a bulk feeder, the gate assembly comprising:

a gate housing including four sidewalls defining a product feed path therein extending between intake and dispensing ends;

four paddles, each of the four paddles mounted to a respective one of the four sidewalls and pivotable between a closed position, in which the product feed path is blocked by the four paddles, and an open position, in which the product feed path is unblocked by the four paddles, each of the four paddles defining at least two sides of a triangular shape such that the plurality of paddles collectively forms an inverted pyramid in the closed position; and at least one actuator connected to the four paddles for effecting movement between the closed and open positions;

wherein each of the four paddles is pivotably mounted outside the gate housing and each sidewall defines a paddle slot through which a respective transition portion of each of the four paddles passes from outside to inside the gate housing.

16. The gate assembly of claim 15, wherein each of the four paddles defines at least two equal sides of an acute isosceles triangle.

17. The gate assembly of claim 15, wherein each of the respective transition portions defines a curved surface about a respective pivot axis of each of the four paddles, the curved surfaces each fitting closely against a respective one of the plurality of paddle slots to inhibit leakage of product therethrough.

18. The gate assembly of claim 17, further comprising four actuators, each of the four actuators connected to a respective one of the four paddles outside the gate housing, each of the four actuator operable to move its respective one of the four paddles about its respective pivot axis.

* * * * *